(12) United States Patent
Iwuchukwu (10) Patent No.: US 8,788,762 B2
(45) Date of Patent: Jul. 22, 2014

(54) METHODS AND APPARATUSES FOR DATA RESOURCE PROVISION

(75) Inventor: Tochukwu Iwuchukwu, Mountain View, CA (US)

(73) Assignee: Nokia Corporation, Espoo (FI)

( * ) Notice: Subject to any disclaimer, the term of this patent is extended or adjusted under 35 U.S.C. 154(b) by 522 days.

(21) Appl. No.: 12/894,977

(22) Filed: Sep. 30, 2010

(65) Prior Publication Data

US 2012/0084516 A1    Apr. 5, 2012

(51) Int. Cl.
   *G06F 12/08*    (2006.01)

(52) U.S. Cl.
   USPC .................... 711/144; 711/E12.037; 709/203

(58) Field of Classification Search
   USPC .......................... 711/144, E12.037; 709/203
   See application file for complete search history.

(56) References Cited

U.S. PATENT DOCUMENTS

| | | | |
|---|---|---|---|
| 6,085,226 A | 7/2000 | Horvitz | |
| 6,243,761 B1 | 6/2001 | Mogul et al. | |
| 6,438,592 B1 | 8/2002 | Killian | |
| 6,874,019 B2 | 3/2005 | Hamilton, II et al. | |
| 7,296,089 B2 | 11/2007 | Krishnamurthy et al. | |
| 7,548,982 B2 | 6/2009 | Gu et al. | |
| 2007/0219708 A1 | 9/2007 | Brasche et al. | |
| 2008/0114543 A1* | 5/2008 | Vishnu | 701/209 |
| 2008/0208789 A1* | 8/2008 | Almog | 706/54 |
| 2009/0281718 A1* | 11/2009 | Gibran et al. | 701/200 |
| 2010/0205292 A1 | 8/2010 | Diaz | |

FOREIGN PATENT DOCUMENTS

EP    2 120 014 A1    11/2009

OTHER PUBLICATIONS

International Search Report and Written Opinion for Application No. PCT/IB2011/053359 dated Feb. 13, 2012.

* cited by examiner

*Primary Examiner* — Yong Choe
(74) *Attorney, Agent, or Firm* — Alston & Bird LLP (57) ABSTRACT

Methods and apparatuses are provided for data resource provision. A method may include receiving a request for a first data resource. The request may include an indication of an additional data resource that may be requested in a future request. The method may further include determining the indicated additional data resource. The method may additionally include causing caching of the additional data resource in preparation for a future request for the additional data resource. Corresponding apparatuses are also provided.

17 Claims, 7 Drawing Sheets

METHODS AND APPARATUSES FOR DATA RESOURCE PROVISION

TECHNOLOGICAL FIELD

Example embodiments of the present invention relate generally to communications technology and, more particularly, relate to methods and apparatuses for data resource provision.

BACKGROUND

The modern communications era has brought about a tremendous expansion of wireline and wireless networks. Wireless and mobile networking technologies have addressed related consumer demands, while providing more flexibility and immediacy of information transfer. Concurrent with the expansion of networking technologies, an expansion in computing power has resulted in development of affordable computing devices capable of taking advantage of services made possible by modern networking technologies. This expansion in computing power has led to a reduction in the size of computing devices and given rise to a new generation of mobile devices that are capable of performing functionality that only a few years ago required processing power that could be provided only by the most advanced desktop computers. Consequently, mobile computing devices having a small form factor have become ubiquitous and are used to access network applications and services by consumers of all socioeconomic backgrounds.

As a result of the expansion in networks and evolution of mobile computing devices, mobile computing devices are increasingly being used to access data resources over networks. As an example, mobile computing devices may run web browser applications, which may be used to access web resources from a server.

BRIEF SUMMARY

Systems, methods, apparatuses, and computer program products are herein provided for data resource provision. Systems, methods, apparatuses, and computer program products in accordance with various embodiments may provide several advantages to computing devices, computing device users, network operators, service providers, and operators of data servers. In this regard, some example embodiments may enhance performance of data provision. More particularly, some example embodiments provide clients configured to provide a hint of an additional data resource that may be requested in a future request in a request for a first data resource. Such example embodiments further provide servers configured to use the hint to prepare for the future request by caching the additional data resource in advance of the future request so as to reduce the response time required for responding to the future request.

Accordingly, some example embodiments may reduce the time a client device and user thereof are required to wait for a response to a request for a data resource. This reduced wait time may improve the perceived performance of services, such as services provided using a client-server model. In this regard, some example embodiments leverage the client's advanced knowledge of an additional data resource(s) that may be requested in future to prepare for such future requests by pre-fetching and caching the additional data resources. As the time required to fetch a cached data resource responsive to a request may be less than a time required to fetch the data resource from disk, request-response time may accordingly be reduced. Further, some example embodiments may provide for more efficient use of a server's cache memory. In this regard, the cache memory may not be large enough to pre-fetch and cache an entire set of available data resources. However, by leveraging hints received from clients, the data resources that are pre-fetched and cached may be limited to those having a probability of being requested in the near future as indicated by received hints.

In a first example embodiment, a method is provided, which comprises receiving a request for a first data resource. The request of this example embodiment comprises an indication of an additional data resource that may be requested in a future request. The method of this example embodiment further comprises determining the indicated additional data resource. The method of this example embodiment also comprises causing caching of the additional data resource in preparation for a future request for the additional data resource.

In another example embodiment, an apparatus comprising at least one processor and at least one memory storing computer program code is provided. The at least one memory and stored computer program code are configured, with the at least one processor, to cause the apparatus of this example embodiment to at least receive a request for a first data resource. The request of this example embodiment comprises an indication of an additional data resource that may be requested in a future request. The at least one memory and stored computer program code are configured, with the at least one processor, to further cause the apparatus of this example embodiment to determine the indicated additional data resource. The at least one memory and stored computer program code are configured, with the at least one processor, to additionally cause the apparatus of this example embodiment to cause caching of the additional data resource in preparation for a future request for the additional data resource.

In another example embodiment, a computer program product is provided. The computer program product of this example embodiment includes at least one computer-readable storage medium having computer-readable program instructions stored therein. The program instructions of this example embodiment comprise program instructions configured to cause receipt of a request for a first data resource. The request of this example embodiment comprises an indication of an additional data resource that may be requested in a future request. The program instructions of this example embodiment further comprise program instructions configured to determine the indicated additional data resource. The program instructions of this example embodiment additionally comprise program instructions configured to cause caching of the additional data resource in preparation for a future request for the additional data resource.

In another example embodiment, an apparatus is provided that comprises means for receiving a request for a first data resource. The request of this example embodiment comprises an indication of an additional data resource that may be requested in a future request. The apparatus of this example embodiment further comprises means for determining the indicated additional data resource. The apparatus of this example embodiment also comprises means for causing caching of the additional data resource in preparation for a future request for the additional data resource.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like.

The term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media. Examples of computer-readable media include a floppy disk, a flexible disk, hard disk, magnetic tape, any other magnetic medium, a compact disc read only memory (CD-ROM), compact disc compact disc-rewritable (CD-RW), digital versatile disc (DVD), Blu-Ray, any other optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Current systems for data provision may suffer from performance issues due to a request-response time required for a server to respond to a client request. In this regard, a client may send a plurality of requests for data resources to a server. As an example, a client may implement a map application needing to fetch a set of n map tiles. The n map tiles may be fetched by the client through issuance of n sequential requests to a server. Assume that none of the n tiles is cached in the server's memory. Also assume that the time to fetch a tile from disk is $t_1$ and the time to fetch a tile from a memory cache is $t_2$, where $t_2$ is relatively small compared to $t_1$. Assume negligible values for other parameters, such as connection setup (e.g., hypertext transfer protocol (HTTP) connection setup time), in the client-server request-response time. Then the total request-response time for n requests=$t_1 * n$.

Some example embodiments disclosed herein may significantly reduce this total request-response time. In this regard, in accordance with some example embodiments, a client's advanced knowledge of future requests may be leveraged by pre-notifying the server of the tile IDs for the remaining n−1 tiles in the initial request for the first tile. The server may fetch these additional tiles into its memory cache while processing the initial request such that the total response time for n requests=$t_1 + (t_2 * (n-1))$. Using an arbitrary example, if it takes 10 ms to fetch a tile from disk and 1 ms to fetch a tile from a memory cache, then in the first case (no pre-notification or hints), the total request-response time to fetch say 10 tiles=100 ms and in the second case (with pre-notification or hints), the total request-response time to fetch 10 tiles=19 ms, an 80 percent improvement.

Figure 1:
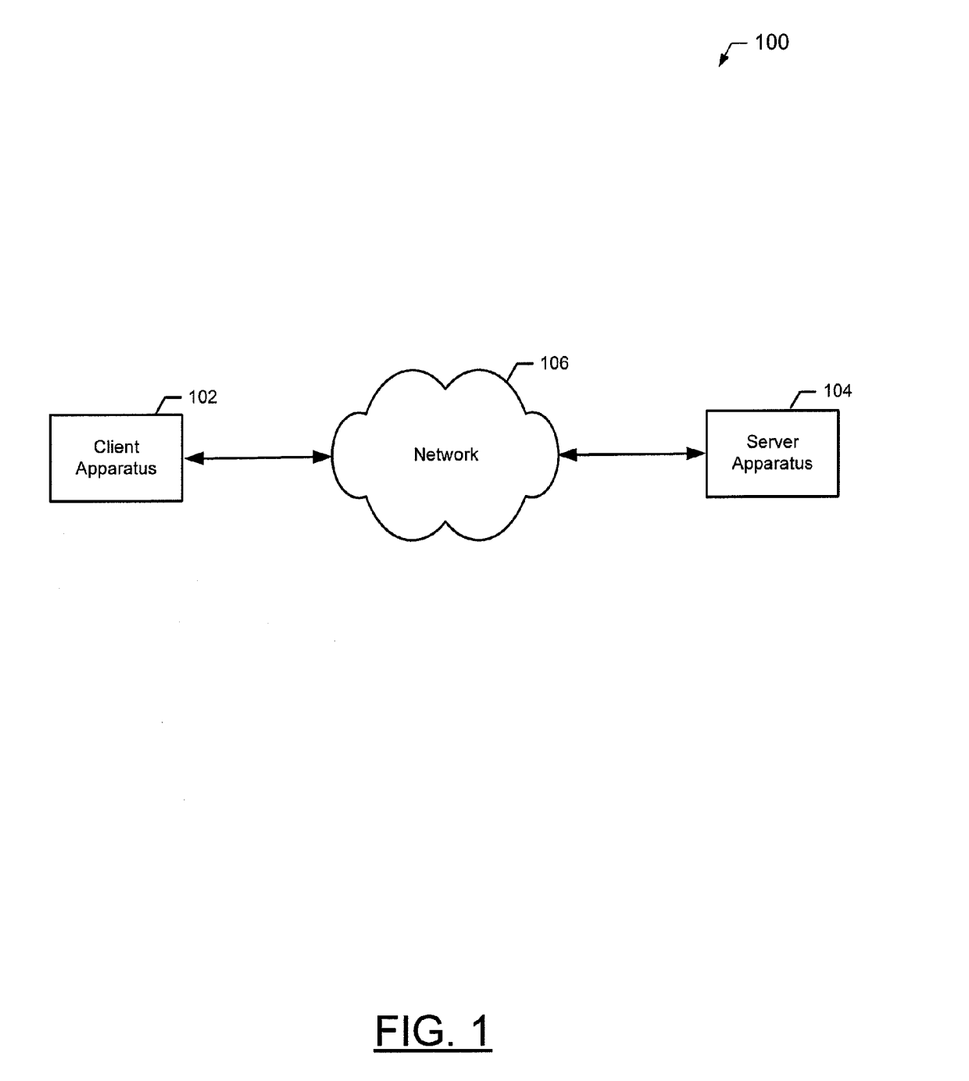
FIG. 1 illustrates a system for data resource provision according to an example embodiment.

Referring now to FIG. 1, FIG. 1 illustrates a block diagram of a system 100 for data resource provision according to an example embodiment. It will be appreciated that the system 100 as well as the illustrations in other figures are each provided as an example of one embodiment and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for data resource provision, numerous other configurations may also be used to implement embodiments of the present invention.

In at least some embodiments, the system 100 includes a client apparatus 102 and server apparatus 104. The client apparatus 102 and server apparatus 104 may be configured to communicate over the network 106. The network 106 may comprise one or more wireless networks (for example, a cellular network, wireless local area network, wireless personal area network, wireless metropolitan area network, and/or the like), one or more wireline networks, or some combination thereof, and in some embodiments comprises at least a portion of the internet.

The client apparatus 102 may be embodied as any computing device, such as, for example, a desktop computer, laptop computer, mobile terminal, mobile computer, mobile phone, mobile communication device, game device, digital camera/camcorder, audio/video player, television device, radio receiver, digital video recorder, positioning device, wrist watch, portable digital assistant (PDA), a chipset, an apparatus comprising a chipset, any combination thereof, and/or the like. In this regard, the client apparatus 102 may be embodied as any computing device configured to request a data resource from the server apparatus 104 over the network 106 and receive the data resource from the server apparatus 104 in response to the request, in accordance with one or more of the example embodiments described further herein below.

The server apparatus 104 may be embodied as one or more servers, a server cluster, a cloud computing infrastructure, one or more desktop computers, one or more laptop computers, one or more mobile computers, one or more network nodes, multiple computing devices in communication with each other, a chipset, an apparatus comprising a chipset, any combination thereof, and/or the like. More particularly, the server apparatus 104 may comprise any computing device or plurality of computing devices configured to communicate with a client apparatus 102 over the network 106 to receive a request for a data resource and to provide the data resource to the client apparatus 102 in response to the request, in accordance with one or more of the example embodiments described further herein below.

Figure 2:
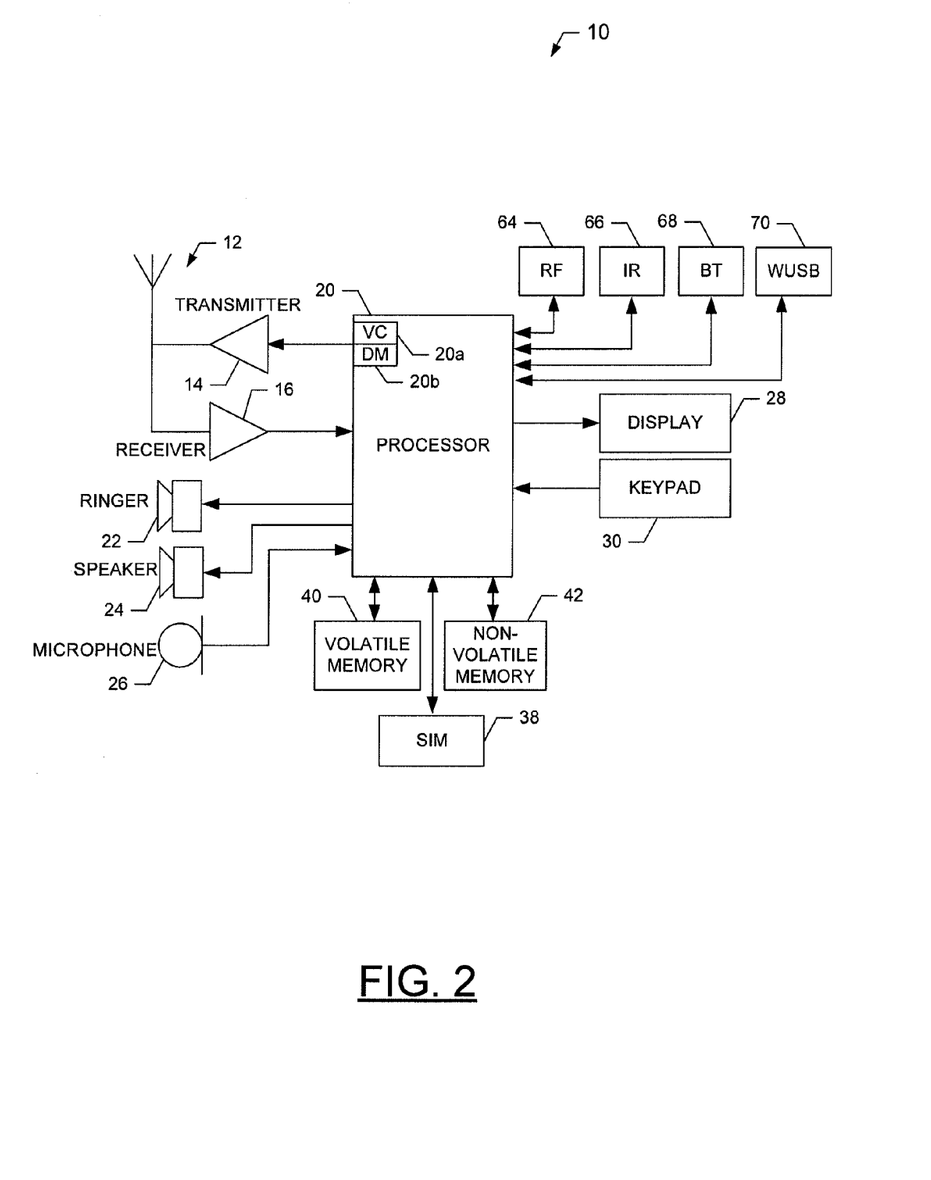
FIG. 2 is a schematic block diagram of a mobile terminal according to an example embodiment.

In an example embodiment, the client apparatus 102 is embodied as a mobile terminal, such as that illustrated in FIG. 2. In this regard, FIG. 2 illustrates a block diagram of a mobile terminal 10 representative of one embodiment of a client apparatus 102. It should be understood, however, that the mobile terminal 10 illustrated and hereinafter described is merely illustrative of one type of client apparatus 102 that may implement and/or benefit from various embodiments and, therefore, should not be taken to limit the scope of the disclosure. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (for example, session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (for example, digital/analog or TDMA/CDMA/analog phones). Additionally, the mobile terminal 10 may be capable of operating according to Wi-Fi or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (for example, software and/or firmware) stored on a memory accessible to the processor 20 (for example, volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (for example, Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wi-Fi, WLAN techniques such as IEEE 802.11 techniques, IEEE 802.15 techniques, IEEE 802.16 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Figure 3:
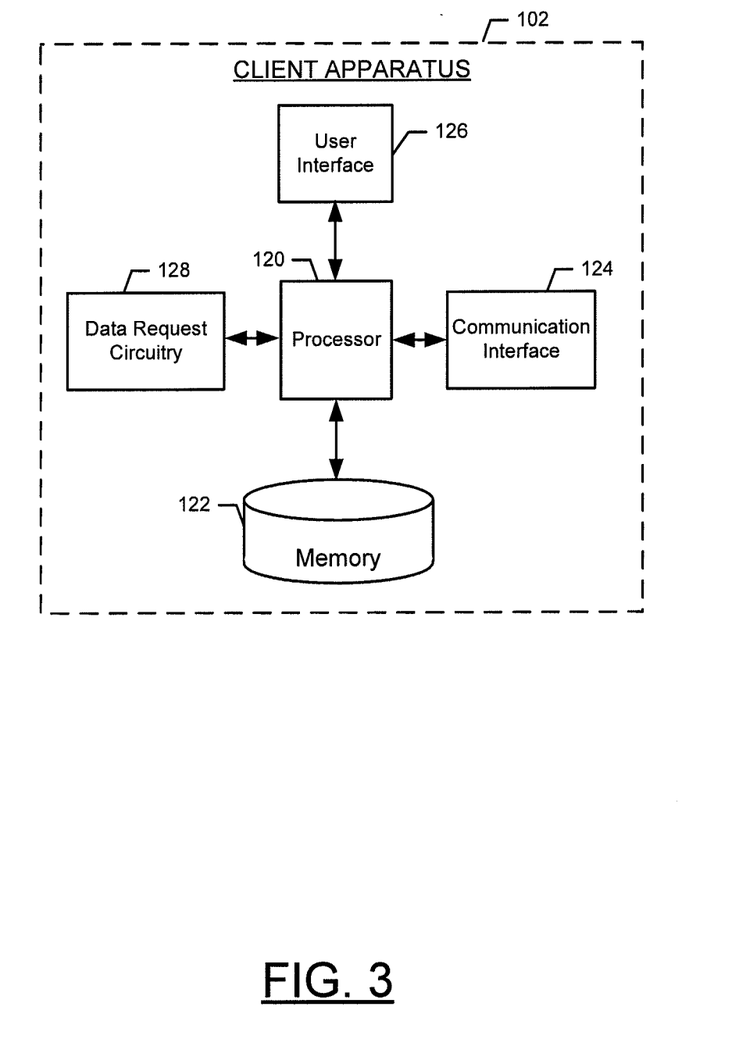
FIG. 3 illustrates a block diagram of a client apparatus according to an example embodiment.

Referring now to FIG. 3, FIG. 3 illustrates a block diagram of a client apparatus 102 according to an example embodiment. In the example embodiment, the client apparatus 102 includes various means for performing the various functions herein described. These means may comprise one or more of a processor 120, memory 122, communication interface 124, user interface 126, or data request circuitry 128. The means of the client apparatus 102 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example memory 122) that is executable by a suitably configured processing device (for example, the processor 120), or some combination thereof.

In some example embodiments, one or more of the means illustrated in FIG. 3 may be embodied as a chip or chip set. In other words, the client apparatus 102 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 120, memory 122, communication interface 124, user interface 126, and/or data request circuitry 128 may be embodied as a chip or chip set. The client apparatus 102 may therefore, in some example embodiments, be configured to implement embodiments of the present invention on a single chip or as a single "system on a chip." As another example, in some example embodiments, the client apparatus 102 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 120 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 3 as a single processor, in some embodiments the processor 120 comprises a plurality of processors. The plurality of processors may be in operative communication with each other and may be collectively configured to perform one or more functionalities of the client apparatus 102 as described herein. The plurality of processors may be embodied on a single computing device or distributed across a plurality of computing devices collectively configured to function as the client apparatus 102. In embodiments wherein the client apparatus 102 is embodied as a mobile terminal 10, the processor 120 may be embodied as or comprise the processor 20. In some example embodiments, the processor 120 is configured to execute instructions stored in the memory 122 or otherwise accessible to the processor 120. These instructions, when executed by the processor 120, may cause the client apparatus 102 to perform one or more of the functionalities of the client apparatus 102 as described herein. As such, whether configured by hardware or software methods, or by a combination thereof, the processor 120 may comprise an entity capable of performing operations according to embodiments of the present invention while configured accordingly. Thus, for example, when the processor 120 is embodied as an ASIC, FPGA or the like, the processor 120 may comprise specifically configured hardware for conducting one or more operations described herein. Alternatively, as another example, when the processor 120 is embodied as an executor of instructions, such as may be stored in the memory 122, the instructions may specifically configure the processor 120 to perform one or more algorithms and operations described herein.

The memory 122 may comprise, for example, volatile memory, non-volatile memory, or some combination thereof. In this regard, the memory 122 may comprise a non-transitory computer-readable storage medium. Although illustrated in FIG. 3 as a single memory, the memory 122 may comprise a plurality of memories. The plurality of memories may be embodied on a single computing device or may be distributed across a plurality of computing devices collectively configured to function as the client apparatus 102. In various example embodiments, the memory 122 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the client apparatus 102 is embodied as a mobile terminal 10, the memory 122 may comprise the volatile memory 40 and/or the non-volatile memory 42. The memory 122 may be configured to store information, data, applications, instructions, or the like for enabling the client apparatus 102 to carry out various functions in accordance with various example embodiments. For example, in some example embodiments, the memory 122 is configured to buffer input data for processing by the processor 120. Additionally or alternatively, the memory 122 may be configured to store program instructions for execution by the processor 120. The memory 122 may store information in the form of static and/or dynamic information. This stored information may be stored and/or used by the data request circuitry 128 during the course of performing its functionalities.

The communication interface 124 may be embodied as any device or means embodied in circuitry, hardware, a computer program product comprising computer readable program instructions stored on a computer readable medium (for example, the memory 122) and executed by a processing device (for example, the processor 120), or a combination thereof that is configured to receive and/or transmit data from/to another computing device. In an example embodiment, the communication interface 124 is at least partially embodied as or otherwise controlled by the processor 120. In this regard, the communication interface 124 may be in communication with the processor 120, such as via a bus. The communication interface 124 may include, for example, an antenna, a transmitter, a receiver, a transceiver and/or supporting hardware or software for enabling communications with one or more remote computing devices. The communication interface 124 may be configured to receive and/or transmit data using any protocol that may be used for communications between computing devices. In this regard, the communication interface 124 may be configured to receive and/or transmit data using any protocol that may be used for transmission of data over a wireless network, wireline network, some combination thereof, or the like by which the client apparatus 102 and one or more computing devices or computing resources may be in communication. As an example, the communication interface 124 may be configured to enable communication between the client apparatus 102 and the server apparatus 104 over a network (for example, the network 106). The communication interface 124 may additionally be in communication with the memory 122, user interface 126, and/or data request circuitry 128, such as via a bus.

The user interface 126 may be in communication with the processor 120 to receive an indication of a user input and/or to provide an audible, visual, mechanical, or other output to a user. As such, the user interface 126 may include, for example, a keyboard, a mouse, a joystick, a display, a touch screen display, a microphone, a speaker, and/or other input/output mechanisms. In embodiments wherein the user interface 126 comprises a touch screen display, the user interface 126 may additionally be configured to detect and/or receive an indication of a touch gesture or other input to the touch screen display. The user interface 126 may be in communication with the memory 122, communication interface 124, and/or data request circuitry 128, such as via a bus.

The data request circuitry 128 may be embodied as various means, such as circuitry, hardware, a computer program product comprising computer readable program instructions stored on a computer readable medium (for example, the memory 122) and executed by a processing device (for example, the processor 120), or some combination thereof and, in some embodiments, is embodied as or otherwise controlled by the processor 120. In embodiments wherein the data request circuitry 128 is embodied separately from the processor 120, the data request circuitry 128 may be in communication with the processor 120. The data request circuitry 128 may further be in communication with one or more of the memory 122, communication interface 124, or user interface 126, such as via a bus.

Figure 4:
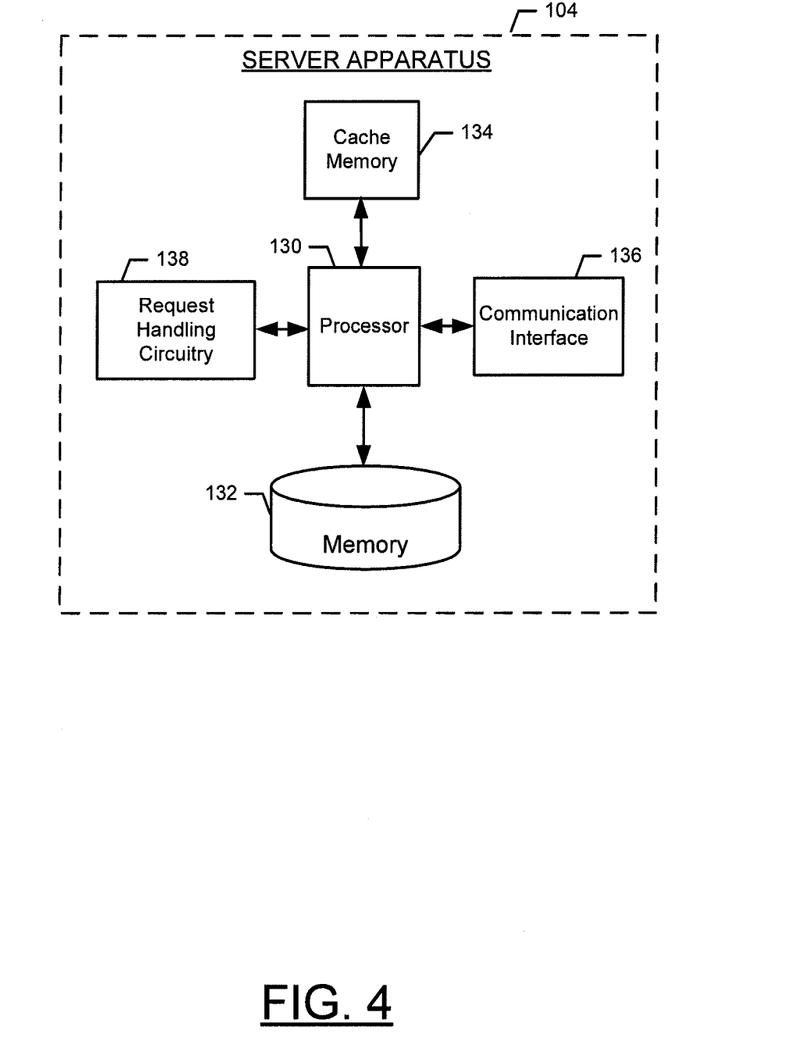
FIG. 4 illustrates a block diagram of a server apparatus according to an example embodiment.

FIG. 4 illustrates a block diagram of a server apparatus 104 according to an example embodiment. In the example embodiment, the server apparatus 104 includes various means for performing the various functions herein described. These means may comprise one or more of a processor 130, memory 132, cache memory 134, communication interface 136, or request handling circuitry 138. The means of the server apparatus 104 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example memory 132) that is executable by a suitably configured processing device (for example, the processor 130), or some combination thereof.

In some example embodiments, one or more of the means illustrated in FIG. 4 may be embodied as a chip or chip set. In other words, the server apparatus 104 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 130, memory 132, cache memory 134, communication interface 136, and/or request handling circuitry 138 may be embodied as a chip or chip set. The server apparatus 104 may therefore, in some example embodiments, be configured to implement embodiments of the present invention on a single chip or as a single "system on a chip." As another example, in some example embodiments, the server apparatus 104 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 130 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 4 as a single processor, in some embodiments the processor 130 comprises a plurality of processors. The plurality of processors may be in operative communication with each other and may be collectively configured to perform one or more functionalities of the server apparatus 104 as described herein. The plurality of processors may be embodied on a single computing device or distributed across a plurality of computing devices collectively configured to function as the server apparatus 104. In some example embodiments, the processor 130 is configured to execute instructions stored in the memory 132 or otherwise accessible to the processor 130. These instructions, when executed by the processor 130, may cause the server apparatus 104 to perform one or more of the functionalities of the server apparatus 104 as described herein. As such, whether configured by hardware or software methods, or by a combination thereof, the processor 130 may comprise an entity capable of performing operations according to embodiments of the present invention while configured accordingly. Thus, for example, when the processor 130 is embodied as an ASIC, FPGA or the like, the processor 130 may comprise specifically configured hardware for conducting one or more operations described herein. Alternatively, as another example, when the processor 130 is embodied as an executor of instructions, such as may be stored in the memory 132, the instructions may specifically configure the processor 130 to perform one or more algorithms and operations described herein.

The memory 132 may comprise, for example, volatile memory, non-volatile memory, or some combination thereof. In this regard, the memory 132 may comprise a non-transitory computer-readable storage medium. Although illustrated in FIG. 4 as a single memory, the memory 132 may comprise a plurality of memories. The plurality of memories may be embodied on a single computing device or may be distributed across a plurality of computing devices collectively configured to function as the server apparatus 104. In various example embodiments, the memory 132 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 132 may be configured to store information, data, applications, instructions, or the like for enabling the server apparatus 104 to carry out various functions in accordance with various example embodiments. For example, in some example embodiments, the memory 132 is configured to buffer input data for processing by the processor 130. Additionally or alternatively, the memory 132 may be configured to store program instructions for execution by the processor 130. The memory 132 may store information in the form of static and/or dynamic information. The stored information may, for example, include one or more data resources. This stored information may be stored and/or used by the request handling circuitry 138 during the course of performing its functionalities.

The cache memory 134 may comprise any one or more memories that may be used to cache a data resource. In this regard, an access time required for accessing a data resource from the cache memory 134 may be less than an access time required for accessing a data resource from the memory 132. A data resource stored in the cache memory 134 may be stored and/or fetched by the request handling circuitry 138.

The communication interface 136 may be embodied as any device or means embodied in circuitry, hardware, a computer program product comprising computer readable program instructions stored on a computer readable medium (for example, the memory 132) and executed by a processing device (for example, the processor 130), or a combination thereof that is configured to receive and/or transmit data from/to another computing device. In an example embodiment, the communication interface 136 is at least partially embodied as or otherwise controlled by the processor 130. In this regard, the communication interface 136 may be in communication with the processor 130, such as via a bus. The communication interface 136 may include, for example, an antenna, a transmitter, a receiver, a transceiver and/or supporting hardware or software for enabling communications with one or more remote computing devices. The communication interface 136 may be configured to receive and/or transmit data using any protocol that may be used for communications between computing devices. In this regard, the communication interface 136 may be configured to receive and/or transmit data using any protocol that may be used for transmission of data over a wireless network, wireline network, some combination thereof, or the like by which the server apparatus 104 and one or more computing devices or computing resources may be in communication. As an example, the communication interface 136 may be configured to enable communication between the server apparatus 104 and the client apparatus 102 over a network (for example, the network 106). The communication interface 136 may additionally be in communication with the memory 132, cache memory 1134, and/or request handling circuitry 138, such as via a bus.

The request handling circuitry 138 may be embodied as various means, such as circuitry, hardware, a computer program product comprising computer readable program instructions stored on a computer readable medium (for example, the memory 132) and executed by a processing device (for example, the processor 130), or some combination thereof and, in some embodiments, is embodied as or otherwise controlled by the processor 130. In embodiments wherein the request handling circuitry 138 is embodied separately from the processor 130, the request handling circuitry 138 may be in communication with the processor 130. The request handling circuitry 138 may further be in communication with one or more of the memory 132, cache memory 134, or communication interface 136, such as via a bus.

In some example embodiments, the data request circuitry 128 is configured to control and/or communicate with a client application run on the client apparatus 102. The client application may, for example, be executed by the processor 120. The client application may, for example, comprise a map application (e.g., a navigation application, a traffic condition application, and/or the like), a web browser, a media player, or the like. In this regard, the client application may comprise any application that may request and/or receive data resources from the server apparatus 104. The received data resources may, for example, be used by the client application to provide an image, video, audio, other data, a service, and/or the like to a user of the client apparatus 102. As non-limiting examples, a data resource may comprise a portion of a map, an audio clip, audio data, a video clip, a video frame, video data, an image, a portion of an image, image data, a web page, text, and/or the like.

The data request circuitry 128 may be configured to format a request (e.g., an HTTP request) for a data resource. The data request circuitry 128 may further determine one or more additional data resources that may be requested in the future. These one or more additional data resources may be determined based on a proximate relationship to the requested data resource, previous usage habits, known current and/or future data resource needs, and/or the like. As an example wherein the requested data resource comprises a portion of a map (e.g., a map tile), the data request circuitry 128 may know that certain portions of the map (e.g., certain map tiles) are needed to complete a portion of the map to be displayed. Accordingly, the data request circuitry 128 may determine those map portions needed to complete the portion of the map to be displayed as additional data resources that may be requested in the future. The data request circuitry 128 may include an indication(s) (e.g., hints) of the one or more additional data resources in the request for the requested data resource. The indication(s), may, for example, comprise parameter(s) identifying the additional data resource(s). The parameters may, for example, be appended to a request.

The data request circuitry 128 may be configured to cause a formatted request to be sent to the server apparatus 104. The request handling circuitry 138 may accordingly be configured to receive a request for a data resource. The request handling circuitry 138 may be further configured to determine an additional data resource indicated in the request. The request handling circuitry 138 may fetch the additional data resource from the memory 132 and cache the additional data resource in the cache memory 134 in preparation for a future request for the additional data resource. In the event that the data request circuitry 128 sends a request for the additional data resource, the request handling circuitry 138 may fetch the cached additional data resource and cause the fetched additional data resource to be provided to the client apparatus 102 in response to the request. Thereby, a request-response time for the additional data resource may be reduced because advance knowledge by the data request circuitry 128 that the additional data resource may be requested in a future request may be leveraged to pre-cache the additional data resource at the server apparatus 104 in preparation for the future request.

As an example, wherein the request comprises a web request for a map tile having the location x=10, y=10, z=10, the uniform resource locator (URL) for the requested data resource may comprise:
    http://maps.nokiapaloalto.com/
    atlas?maptype=street&x=10&y=10&z=10.
The data request circuitry 128 may determine that additional map tiles located at x=11, y=10, and z=10; and x=12, y=10, z=10 may be requested in the future. Accordingly, the data request circuitry 128 may format a request comprising parameters indicating those additional map tiles. The URL for this request may, for example, comprise:
    http://maps.nokiapaloalto.com/
    atlas?maptype=street&x=10&y=10&z=10&hints=x:11,y: 10,z: 10|x:12, y:10, z:10.
In this regard, the data request circuitry may format the URL for the request such that the respective parameters indicating the additional map tiles facilitate parsing of the request and extraction of the parameters by the handling circuitry 138. In the above example, the "|" character is used to separate the parameter x:11,y:10,z:10 and the parameter x:12, y:10, z:10. It will be appreciated, however, that the "|" character is used by way of example of one delimiting character that may be used to separate parameters and not by way of limitation. Accordingly, other delimiting characters may be used in other embodiments.

The request handling circuitry 138 may determine based on the appended parameters that the next two requests will be:
    (1)        http://maps.nokiapaloalto.com/
        atlas?maptype=street&x=11&y=10&z=10; and
    (2)        http://maps.nokiapaloalto.com/
        atlas?maptype=street&x=12&y=10&z=10.
In this regard, the request handling circuitry 138 may, for example, parse the request and extract the appended parameters based at least in part on delimiting character(s) (e.g., the "|" character used in the above example request) separating the parameters identifying additional data resources. The request handling circuitry 138 may accordingly retrieve the additional tiles from the memory 132 and cache them in the cache memory 134 in preparation for the next two requests.

In an instance in which the data request circuitry 128 includes a plurality of parameters identifying additional data resources in a request, the parameters may be arranged in an order corresponding to an order in which the additional data resources may be requested in the future. Accordingly, the request handling circuitry 138 may fetch and cache the additional data resources in the indicated order, thereby prioritizing resources of the server apparatus 104 based on an expected sequence of requests from the client apparatus 102.

In some example embodiments, the request handling circuitry 138 may be configured to perform a verification test prior to caching an indicated additional data resource to determine whether a relationship between a requested data resource and the additional data resource satisfies a predefined validity criterion. In such embodiments, the request handling circuitry 138 may cache the additional data resource only in an instance in which it is determined that the relationship satisfies the predefined validity criterion. Otherwise, the request handling circuitry 138 may ignore the indicated additional data resource. In this regard, if the additional data resource does not have at least a predefined level of relatedness to the requested data resource, then the indication of the additional data resource may be in error and it may be unlikely that the indicated additional data resource will be requested at least in the relatively near future.

As an example wherein a requested data resource and an additional data resource indicated in the request comprise first and second portions of a map, the request handling circuitry 138 may be configured to perform the verification test by determining whether a location of the first portion of the map is within a predefined proximity (e.g., within a 32×32 block) of the second portion of the map. In this regard, if the second portion of the map is not in the "region" of the first portion, the request handling circuitry 138 may ignore the hint indicating the second portion in the request for the first portion and thus may not cache the second portion. Thus consider:

Tile ID requested in request: x=10, y=10, z=10
Additional tile IDs indicated in the request: x=100, y=10, z=10; x=200, y=10, z=10

As may be seen, the additional tile IDs are not located proximate to the requested tile ID, as the x values are significantly different (e.g., by an order of magnitude). The request handling circuitry 138 may determine that the relationship between the requested tile ID and additional tile IDs does not satisfy a predefined validity criterion and may ignore the indication of the additional tile IDs. In contrast, the request handling circuitry 128 may determine that the additional tile IDs and requested tile ID in the following example have a relationship satisfying a predefined validity criterion because the tiles have locations proximate to each other:

Tile ID requested in request: x=10, y=10, z=10
Additional tile IDs indicated in the request: x=11, y=10, z=10; x=12, y=10, z=10

As another example, the request handling circuitry 138 may perform a verification test by determining whether a zoom level of a requested data resource (e.g., a first map tile or other image) is identical to a zoom level of an indicated additional data resource (e.g., a second map tile or other image). If the zoom levels are the same, then the request handling circuitry 138 may cache the indicated additional data resource. Otherwise, the request handling circuitry 138 may ignore the indicated additional data resource.

It will be appreciated that the validity criterion used for performing a verification test may vary depending on the type of data resource requested. For example, the requested data resource may comprise a song (e.g., a track). The song may have been recorded by a particular artist. Accordingly, the request handling circuitry 138 may perform a verification test by determining whether an indicated additional song is recorded by the same artist as the requested song. Other example verification tests that may be performed when a requested data resource is a song include determining whether the requested song and additional song are on the same album, determining whether the requested song and additional song are in the same genre, and/or the like.

As another example, the requested data resource may comprise a video. The video may be an episode of a particular television show. Accordingly, the request handling circuitry 138 may be configured to perform a verification test by determining whether an indicated additional video is another episode of the same television show. Other example verification tests that may be performed when a requested data resource is a video include determining whether the requested video and additional video star the same actor(s) and/or the same actress(es), determining whether the requested video and additional video were directed by the same director, and/or the like.

As a further example, the requested data resource may comprise a URL for a web page and an indicated additional data resource may comprise another URL. The request handling circuitry 138 may perform a verification test by determining whether the additional URL is linked from the requested web page. If the additional URL is linked from the requested web page, then the request handling circuitry 138 may cache the web page linked by the additional URL in preparation for a future request for the additional URL. If, however, the additional URL is not linked from the requested web page, the request handling circuitry 138 may ignore the indicated additional URL.

As another example, the requested data resource may comprise a photo that is known to depict a particular individual and the indicated additional data resource may comprise another photo. The request handling circuitry 138 may perform a verification test by determining whether the additional photo depicts the same individual as the requested photo, determining whether the additional photo depicts an individual having a particular familial relationship with the individual in the requested photo (e.g., child, sibling, parent, spouse, and/or the like), determining whether the additional photo depicts an individual that is a "friend" of the individual in the requested photo (e.g., based upon a relationship defined by a social network of which the individual in the requested photo is a member) and/or the like. Other example verification tests that may be performed when a requested data resource is a photo include determining whether the requested photo and additional photo depict a same and/or similar object (e.g., building, landmark, land feature, and/or the like), determining whether the requested photo and additional photo depict objects located in the same city, and/or the like.

In some example embodiments, a data resource may comprise dynamically changing information that must be updated. As an example, the data resource may comprise a portion of a traffic map and may comprise dynamically changing information about traffic conditions for one or more road segments in the portion of the traffic map. In such embodiments, if a portion of a traffic map is indicated as an additional data resource that may be requested in the future, the request handling circuitry 138 may update (e.g., if needed) the additional data resource prior to caching the additional data resource. Thus, for example, the request handling circuitry 138 may update traffic conditions for a portion of a traffic map if the traffic conditions for one or more road segments in the portion of the traffic map have changed since the traffic map portion was last updated. In this regard, a relatively significant amount of time may be required to update such dynamically changing information and the request handling circuitry 138 may prepare for a future request by updating and caching a data resource that may be requested in the future. Such embodiments may significantly improve request-response time.

As an example, assume that a maps applications client is to issue two requests for two traffic tiles $T_i$ and $T_j$. The traffic tiles may be dynamic in nature since a traffic tile must be updated whenever traffic conditions change for any road segment on the tile. Assume that $T_i$ and $T_j$ are cached. However, $T_i$ and $T_j$ are stale, that is, they must be updated because traffic conditions for some road segments on the tiles have changed. Now assume that the average time to retrieve a tile from the cache is $t_1$ and the average time to update and render a traffic tile is $t_2$ where $t_2$ will typically be larger than $t_1$. For simplicity, also assume negligible values for other parameters in the client-server request-response time such as the connection set-up time.

Request-response time for a mere caching technique wherein traffic tiles are automatically and indiscriminately cached may be defined as: $(t_1+t_2)+(t_1+t_2)$. In this regard, even though the traffic tiles were already cached, the traffic tiles still had to be updated before being returning to the requesting client.

Request-response time for a pre-fetching technique wherein the client pre-fetches all of the traffic tiles may be defined as: $(t_1+t_2)+(t_1+t_2)$. In this regard, even though the client pre-fetches tile $T_j$, the client still has to make the request for $T_j$ and $T_j$ is also out-of-date when the server receives the request. Therefore, the updating of $T_j$ is still performed subsequent to the request and factors into the request-response time.

Comparatively, request-response time in accordance with an example embodiment may be defined as: $(t_1+t_2)+t_1$. In this regard, if the request for $T_i$ includes an indication that the next request will be for $T_j$, the request handling circuitry 138 may update $T_j$ before receiving the actual request for $T_j$. Therefore, the request-response time for $T_j$ may be defined entirely in terms of the fetch time required to retrieve the tile from cache.

Operation of an example embodiment will now be described. In this example, a map client application (e.g., a navigation application, traffic application, or the like) may be implemented on the client apparatus 102 and the server apparatus 104 may comprise a maps server. It will be appreciated, however, that this example is described in terms of a map client application and a maps server solely for purposes of example of data provision in accordance with one example embodiment and not by way of limitation. Accordingly, it will be appreciated that other types of client applications may be implemented on the client apparatus 102 and the server apparatus 104 may comprise a server for a type of data resource(s) in addition to or in lieu of maps.

A user of the client apparatus 102 may launch a map client application on the client apparatus 102, such as by entering a URL into a web browser. The map client application may display a street view of a map on a display of the client apparatus 102. The user may select an option to view live road traffic information on the map. As the user pans the map, the map client application and/or the data request circuitry 128 may compute the set S of map tiles to be fetched from the server 104 based on the current view on the display. For each tile T in S, the data request circuitry 128 may issue two requests to the server 104. The first request may be to retrieve the street tile image of T and the second request may be to retrieve the traffic tile image of T to overlay on the street tile image.

The data request circuitry 128 may format a request to retrieve the street tile image for one of the tiles T in the set S. The data request circuitry 128 may append "hints" parameters to the request, specifying the set S-T of tiles to be requested in subsequent requests. For instance, if the tile ID for the tile in the upper left corner of the display is x=10, y=10, z=10 and a 3×3 set of tiles (nine tiles) fits into the display, then the data request circuitry 128 may format the following request (e.g., an HTTP GET request): http://maps.nokiapaloalto.com/atlas?maptype=street&x=10&y=10&z=10&hints=x:11,y:10,z:10|x:12,y:10,z:10|x:10,y:11,z:10|x:11,y:11,z:10|x:12,y:11, z:10|x:10,y:12,z:10|x:11,y:12,z:10|x:12,y:12,z:10. In embodiments wherein the request comprises an HTTP GET request, the parameters indicating the set S-T of tiles may be formatted such that the characters "=" and "&" are not used, as these are reserved characters that have special meanings in a URL query string.

The request handling circuitry 138 may receive the request. The request handling circuitry 138 may determine the tile ID of the requested tile in the request and determine whether the corresponding tile is in the cache memory 134. If the tile is not in the cache memory 134, the request handling circuitry 138 may fetch the requested tile from memory 132, place the tile in the cache memory 134, and cause the requested tile to be returned to the client apparatus 102.

The request handling circuitry 138 may further determine whether the request includes a parameter(s) indicating an additional tile(s) that may be requested by the client apparatus 102 in a future request(s). As the received request includes parameters specifying the set S-T of tiles, the request handling circuitry 138 may determine the additional tiles indicated in the request. The request handling circuitry 138 may further perform a verification test to determine whether a relationship between the requested tile and the additional tile(s) satisfies a predefined validity criterion. For example, the request handling circuitry 138 may determine whether the additional tiles are within a predefined proximity of the requested tile (e.g, within a 32×32 region surrounding the requested tile (e.g., tile ID x=10, y=10, z=10).

If the verification test fails for an additional tile indicated by a parameter, the request handling circuitry 138 may ignore the additional tile. However, if an indicated additional tile passes the verification test, the request handling circuitry 138 may fetch the additional tile from the memory 132 and cache the tile in the cache memory 134 in preparation for a future request for the tile. Accordingly, if the client apparatus 102 later sends a request for tile ID, x=11, y=10, z=10, http://maps.nokiapaloalto.com/atlas?maptype=street&x=11&y=10&z=10, the request handling circuitry 138 may fetch and serve the tile directly from the cache memory 134.

It will be appreciated that the data request circuitry 128 is not limited to including hint parameters indicating additional tiles that may be requested in future requests in only the first request in a series of requests. In this regard, the data request circuitry 128 may also include hint parameters in one or more subsequent requests, such as to indicate further additional tiles and/or to allow for cases where the server has ignored previous indications.

After retrieving all of the street tiles in the set S to fill the user's display, the data request circuitry 128 may format and send similar requests to retrieve the traffic tiles by changing the "maptype" parameter value to "traffic." For example, a request for the traffic tile ID, x=10, y=10, z=10 may be formatted as: http://maps.nokiapaloalto.com/atlas?maptype=traffic&x=10&y=10&z=10&hints=x:11,y:10,z:10|x:12,y:10,z:10|x:10,y:11,z:10|x:11,y:11,z:10|x:12,y:11, z:10|x:10,y:12,z:10|x:11,y:12,z:10|x:12,y:12,z:10. The data request circuitry 128 may cause the formatted request to be sent to the server apparatus 104.

The request handling circuitry 138 may receive the request. The request handling circuitry 138 may determine the tile ID of the traffic tile requested in the request and determine whether the corresponding traffic tile is in the cache memory 134. If the requested traffic tile is not in the cache memory 134, the request handling circuitry 138 may fetch the requested traffic tile from memory 132. The request handling circuitry 138 may further determine whether traffic conditions have changed for any road segment in the traffic tile and, if so, update the traffic conditions illustrated in the traffic tile by re-rendering the traffic tile to illustrate current traffic conditions. The request handling circuitry 138 may then place the updated traffic tile in the cache memory 134. The request handling circuitry 138 may further cause the requested traffic tile to be returned to the client apparatus 102.

The request handling circuitry 138 may further determine whether the request includes a parameter(s) indicating an additional traffic tile(s) that may be requested by the client apparatus 102 in a future request(s). As the received request includes parameters specifying a set of additional traffic tiles, the request handling circuitry 138 may determine the additional traffic tiles indicated in the request. The request handling circuitry 138 may further perform a verification test to determine whether a relationship between the requested traffic tile and the additional traffic tile(s) satisfies a predefined validity criterion. For example, the request handling circuitry 138 may determine whether the additional traffic tiles are within a predefined proximity of the requested traffic tile (e.g., within a 32×32 region surrounding the requested traffic tile (e.g., tile ID x=10, y=10, z=10).

If the verification test fails for an additional traffic tile indicated by a parameter, the request handling circuitry 138 may ignore the additional traffic tile. However, if an indicated additional tile passes the verification test, the request handling circuitry 138 may fetch the additional tile from the memory 132. The request handling circuitry 138 may further determine whether traffic conditions have changed for any road segment in the additional traffic tile and, if so, update the traffic conditions illustrated in the additional traffic tile by re-rendering the additional traffic tile to illustrate current traffic conditions. The request handling circuitry 138 may further cache the traffic tile in the cache memory 134 in preparation for a future request for the traffic tile. Accordingly, if the client apparatus 102 later sends a request for traffic tile ID, x=11, y=10, z=10, http://maps.nokiapaloalto.com/atlas?maptype=traffic&x=11&y=10&z=10, the request handling circuitry 138 may fetch and serve the traffic tile directly from the cache memory 134.

Figure 5:
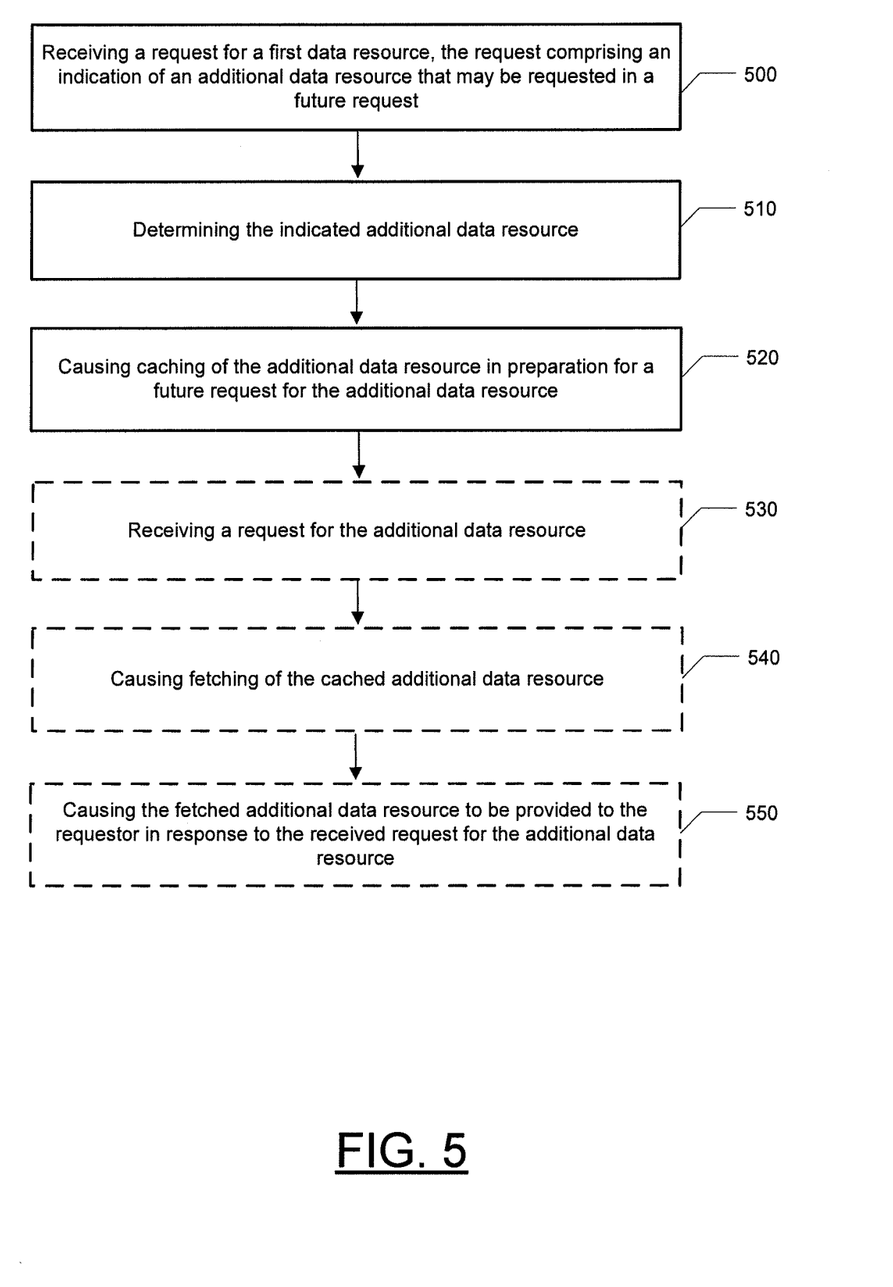
FIG. 5 illustrates a flowchart according to an example method for data resource provision according to an example embodiment.

FIG. 5 illustrates a flowchart according to an example method for resource provision according to an example embodiment. In this regard, FIG. 5 illustrates operations that may be performed at the server apparatus 104. The operations illustrated in and described with respect to FIG. 5 may, for example, be performed by, with the assistance of, and/or under the control of one or more of the processor 130, memory 132, cache memory 134, communication interface 136, or request handling circuitry 138. Operation 500 may comprise receiving a request for a data resource. The request may comprise an indication of an additional data resource that may be requested in a future request. The processor 130, memory 132, communication interface 136, and/or request handling circuitry 138 may, for example, provide means for performing operation 500. Operation 510 may comprise determining the indicated additional resource. The processor 130, memory 132, and/or request handling circuitry 138 may, for example, provide means for performing operation 510. Operation 520 may comprise causing caching of the additional data resource in preparation for a future request for the additional data resource. The processor 130, memory 132, cache memory 134, and/or request handling circuitry 138 may, for example, provide means for performing operation 520.

Operations 530-550 may be optionally performed in an instance in which a client issues a request for the additional data resource. Operation 530 may comprise receiving a request for the additional data resource. The processor 130, memory 132, communication interface 136, and/or request handling circuitry 138 may, for example, provide means for performing operation 530. Operation 540 may comprise causing fetching of the cached additional resource. The processor 130, memory 132, cache memory 134, and/or request handling circuitry 138 may, for example, provide means for performing operation 540. Operation 550 may comprise causing the fetched additional data resource to be provided to the requesting client in response to the received request for the additional data resource. The processor 130, memory 132, communication interface 136, and/or request handling circuitry 138 may, for example, provide means for performing operation 550.

Figure 6:
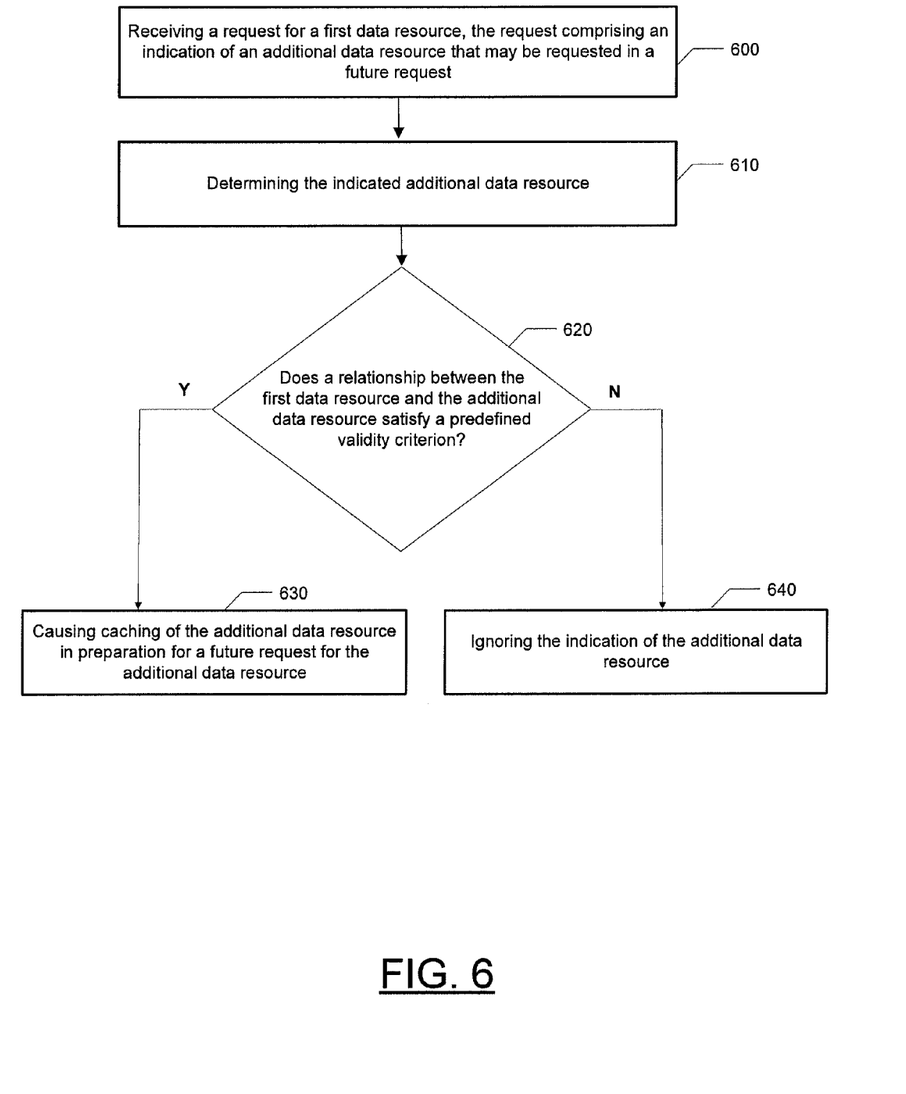
FIG. 6 illustrates a flowchart according to an example method for data resource provision according to an example embodiment.

FIG. 6 illustrates a flowchart according to an example method for resource provision according to an example embodiment. In this regard, FIG. 6 illustrates operations that may be performed at the server apparatus 104. The operations illustrated in and described with respect to FIG. 6 may, for example, be performed by, with the assistance of, and/or under the control of one or more of the processor 130, memory 132, cache memory 134, communication interface 136, or request handling circuitry 138. Operation 600 may comprise receiving a request for a data resource. The request may comprise an indication of an additional data resource that may be requested in a future request. The processor 130, memory 132, communication interface 136, and/or request handling circuitry 138 may, for example, provide means for performing operation 600. Operation 610 may comprise determining the indicated additional resource. The processor 130, memory 132, and/or request handling circuitry 138 may, for example, provide means for performing operation 610. Operation 620 may comprise performing a verification test to determine whether a relationship between the first data resource and the additional data resource satisfies a predefined validity criterion. The processor 130, memory 132, and/or request handling circuitry 138 may, for example, provide means for performing operation 620.

In an instance in which it is determined at operation 620 that the relationship does satisfy the predefined validity criterion, operation 630 may comprise causing caching of the additional data resource in preparation for a future request for the additional data resource. The processor 130, memory 132, cache memory 134, and/or request handling circuitry 138 may, for example, provide means for performing operation 630. If, however, it is determined at operation 620 that the relationship does not satisfy the predefined validity criterion, operation 640 may comprise ignoring the indication of the additional data resource. The processor 130, memory 132, and/or request handling circuitry 138 may, for example, provide means for performing operation 640.

Figure 7:
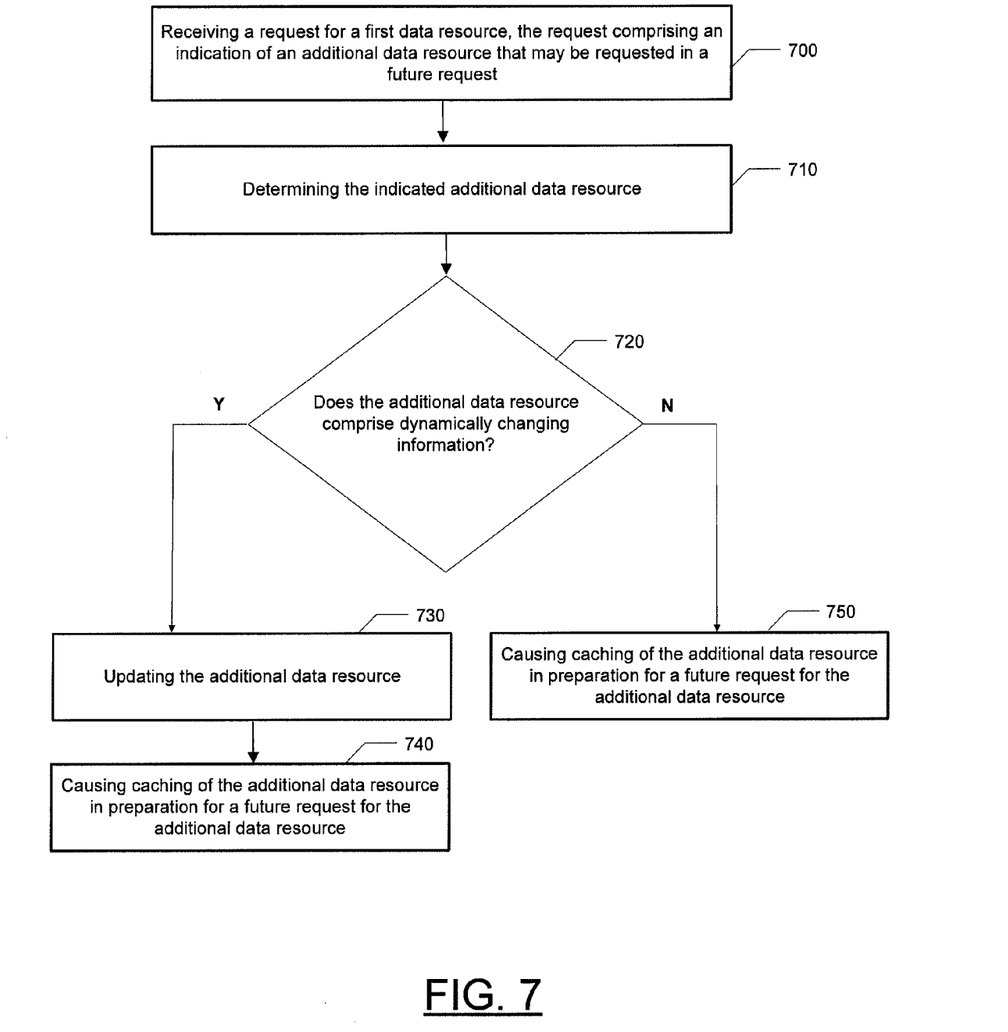
FIG. 7 illustrates a flowchart according to an example method for data resource provision according to an example embodiment.

FIG. 7 illustrates a flowchart according to an example method for resource provision according to an example embodiment. In this regard, FIG. 7 illustrates operations that may be performed at the server apparatus 104. The operations illustrated in and described with respect to FIG. 7 may, for example, be performed by, with the assistance of, and/or under the control of one or more of the processor 130, memory 132, cache memory 134, communication interface 136, or request handling circuitry 138. Operation 700 may comprise receiving a request for a data resource. The request may comprise an indication of an additional data resource that may be requested in a future request. The processor 130, memory 132, communication interface 136, and/or request handling circuitry 138 may, for example, provide means for performing operation 700. Operation 710 may comprise determining the indicated additional resource. The processor 130, memory 132, and/or request handling circuitry 138 may, for example, provide means for performing operation 710. Operation 720 may comprise determining whether the additional data resource comprises dynamically changing information. The processor 130, memory 132, and/or request handling circuitry 138 may, for example, provide means for performing operation 720.

In an instance in which it is determined at operation 720 that the additional data resource does comprise dynamically changing information, operation 730 may comprise updating the additional data resource. The processor 130, memory 132, and/or request handling circuitry 138 may, for example, provide means for performing operation 730. Operation 740 may comprise causing caching of the additional data resource in preparation for a future request for the additional data resource. The processor 130, memory 132, cache memory 134, and/or request handling circuitry 138 may, for example, provide means for performing operation 740. If, however, it is determined at operation 720 that the data resource does not comprise dynamically changing information, operation 750 may comprise causing caching of the additional data resource in preparation for a future request for the additional data resource. The processor 130, memory 132, cache memory 134, and/or request handling circuitry 138 may, for example, provide means for performing operation 750.

It will be appreciated that in some example embodiments, the method illustrated in FIG. 6 may be combined with the method illustrated in FIG. 7. For example, in such embodiments, one or more of operations 720-750 may be performed subsequent to operation 620 in lieu of operation 630 in an instance in which it is determined that a relationship between the first data resource and the additional data resource satisfies a predefined validity criterion.

FIGS. 5-7 each illustrate a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 122 and/or in the memory 132) and executed by a processor in the computing device (for example, by the processor 120 and/or by the processor 130). In some embodiments, the computer program instructions comprising the computer program product(s) which embody the procedures described above may be stored by memory devices of a plurality of computing devices. As will be appreciated, any such computer program product may be loaded onto a computer or other programmable apparatus (for example, a client apparatus 102 and/or a server apparatus 104) to produce a machine, such that the computer program product including the instructions which execute on the computer or other programmable apparatus creates means for implementing the functions specified in the flowchart block (s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, a client apparatus 102 and/or a server apparatus 104) to cause a series of operations to be performed on the computer or other programmable apparatus to produce a computer-implemented process such that the instructions which execute on the computer or other programmable apparatus implement the functions specified in the flowchart block (s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product (s).

The above described functions may be carried out in many ways. For example, any suitable means for carrying out each of the functions described above may be employed to carry out embodiments of the invention. In one embodiment, a suitably configured processor (for example, the processor 120 and/or processor 130) may provide all or a portion of the elements. In another embodiment, all or a portion of the elements may be configured by and operate under control of a computer program product. The computer program product for performing the methods of an example embodiment includes a computer-readable storage medium (for example, the memory 122 and/or memory 132), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
   receiving a request for a first data resource, the request comprising an indication of an additional data resource to be requested in a future request;
   determining, by request handling circuitry, the indicated additional data resource;
   causing caching of the additional data resource in preparation for a future request for the additional data resource;
   performing a verification test to determine whether a relationship between the first data resource and the additional data resource satisfies a predefined validity criterion; and
   wherein causing caching of the additional data resource comprises causing caching of the additional data resource only in an instance in which it is determined that the relationship between the data resource and the additional data resource satisfies the predefined validity criterion.

2. The method of claim 1, further comprising:
receiving a request for the additional data resource;
causing fetching of the cached additional data resource; and
causing the fetched additional data resource to be provided to the requestor in response to the received request for the additional data resource.

3. The method of claim 1, wherein the first data resource and the additional data resource respectively comprise first and second portions of a map, and wherein performing the verification test comprises determining whether a location of the first portion of the map is within a predefined proximity of the second portion of the map.

4. The method of claim 1, wherein the additional data resource comprises dynamically changing information that must be updated, the method further comprising:
updating the additional data resource prior to causing caching of the additional data resource.

5. The method of claim 4, wherein the additional data resource comprises a portion of a traffic map and the dynamically changing information comprises information about traffic conditions for one or more road segments in the portion of the traffic map, and wherein updating the additional data resource comprises updating the traffic conditions for the portion of the traffic map.

6. The method of claim 1, wherein the indication comprises a parameter of the request, the parameter identifying the additional data resource.

7. The method of claim 1, wherein receiving the request comprises receiving a request at a maps server, the request comprising a request for map data originated by a map application of a client apparatus.

8. An apparatus comprising at least one processor and at least one memory storing computer program code, wherein the at least one memory and stored computer program code are configured, with the at least one processor, to cause the apparatus to at least:
receive a request for a first data resource, the request comprising an indication of an additional data resource to be requested in a future request;
determine the indicated additional data resource;
cause caching of the additional data resource in preparation for a future request for the additional data resource;
perform a verification test to determine whether a relationship between the first data resource and the additional data resource satisfies a predefined validity criterion; and
cause caching of the additional data resource only in an instance in which it is determined that the relationship between the data resource and the additional data resource satisfies the predefined validity criterion.

9. The apparatus of claim 8, wherein the at least one memory and stored computer program code are configured, with the at least one processor, to further cause the apparatus to:
receive a request for the additional data resource;
cause fetching of the cached additional data resource; and
cause the fetched additional data resource to be provided to the requestor in response to the received request for the additional data resource.

10. The apparatus of claim 8, wherein the first data resource and the additional data resource respectively comprise first and second portions of a map, and wherein the at least one memory and stored computer program code are configured, with the at least one processor, to cause the apparatus to perform the verification test at least in part by determining whether a location of the first portion of the map is within a predefined proximity of the second portion of the map.

11. The apparatus of claim 8, wherein the additional data resource comprises dynamically changing information that must be updated, and wherein the at least one memory and stored computer program code are configured, with the at least one processor, to further cause the apparatus to:
update the additional data resource prior to causing caching of the additional data resource.

12. The apparatus of claim 11, wherein the additional data resource comprises a portion of a traffic map and the dynamically changing information comprises information about traffic conditions for one or more road segments in the portion of the traffic map, and wherein the at least one memory and stored computer program code are configured, with the at least one processor, to cause the apparatus to update the additional data resource at least in part by updating the traffic conditions for the portion of the traffic map.

13. The apparatus of claim 8, wherein the indication comprises a parameter of the request, the parameter identifying the additional data resource.

14. The apparatus of claim 8, wherein the apparatus comprises or is embodied on a server apparatus and the received request is originated by an application on a client apparatus.

15. A computer program product comprising at least one non-transitory computer-readable storage medium having computer-readable program instructions stored therein, the computer-readable program instructions configured to cause an apparatus to perform:
receiving a request for a first data resource, the request comprising an indication of an additional data resource to be requested in a future request;
determining the indicated additional data resource;
caching the additional data resource in preparation for a future request for the additional data resource;
performing a verification test to determine whether a relationship between the first data resource and the additional data resource satisfies a predefined validity criterion; and
causing caching of the additional data resource only in an instance in which it is determined that the relationship between the data resource and the additional data resource satisfies the predefined validity criterion.

16. The computer program product of claim 15, further comprising program instructions configured to cause an apparatus to perform:
receiving a request for the additional data resource;
causing fetching of the cached additional data resource; and
causing the fetched additional data resource to be provided to the requestor in response to the received request for the additional data resource.

17. The computer program product of claim 15, wherein the additional data resource comprises dynamically changing information that must be updated, and further comprising program instructions configured to cause an apparatus to perform:
updating the additional data resource prior to causing caching of the additional data resource.

* * * * *